(12) United States Patent
Oh

(10) Patent No.: US 11,172,734 B2
(45) Date of Patent: Nov. 16, 2021

(54) GAGING APPARATUS AND METHOD FOR AUTOMATION OF SHOEMAKING PROCESS

(71) Applicant: ELECTRONICS AND TELECOMMUNICATIONS RESEARCH INSTITUTE, Daejeon (KR)

(72) Inventor: Hyun-Woo Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 133 days.

(21) Appl. No.: 16/698,635

(22) Filed: Nov. 27, 2019

(65) Prior Publication Data

US 2020/0163417 A1    May 28, 2020

(30) Foreign Application Priority Data

Nov. 28, 2018 (KR) .................. 10-2018-0150074
Nov. 20, 2019 (KR) .................. 10-2019-0149904

(51) Int. Cl.
| | |
|---|---|
| *A43D 8/26* | (2006.01) |
| *G05B 19/402* | (2006.01) |
| *B43L 13/02* | (2006.01) |
| *G01B 5/00* | (2006.01) |
| *B25J 9/16* | (2006.01) |

(52) U.S. Cl.
CPC .............. *A43D 8/26* (2013.01); *B25J 9/1684* (2013.01); *B43L 13/022* (2013.01); *G01B 5/00* (2013.01); *G05B 19/402* (2013.01); *A43D 2200/60* (2013.01); *G05B 2219/45243* (2013.01)

(58) Field of Classification Search
CPC ............ A43D 2200/60; A43D 2200/10; A43D 25/06; A43D 8/26; B25J 9/1684; B43L 13/022; G01B 5/00; G05B 19/402; G05B 2219/45243
See application file for complete search history.

(56) References Cited

U.S. PATENT DOCUMENTS

| 4,996,012 | A | * | 2/1991 | Gierschewski .... | G05B 19/4207 264/40.1 |
|---|---|---|---|---|---|
| 8,571,827 | B2 | | 10/2013 | Jang et al. | |
| 2013/0132038 | A1 | * | 5/2013 | Regan ................... | G01B 11/24 703/1 |
| 2014/0081441 | A1 | * | 3/2014 | Regan ................... | G06F 30/13 700/98 |

(Continued)

FOREIGN PATENT DOCUMENTS

| KR | 10-1903433 B1 | 10/2018 | |
|---|---|---|---|
| KR | 10-2019-0000423 A | 1/2019 | |
| WO | WO-2015180016 A1 * | 12/2015 | ............... B05D 1/02 |

*Primary Examiner* — Ronald D Hartman, Jr.
(74) *Attorney, Agent, or Firm* — Rabin & Berdo, P.C.

(57) ABSTRACT

A gaging apparatus and method for automation of a shoemaking process are provided for automating a shoemaking process. According to the method, the gaging apparatus obtains operation data according to the gaging process of drawing a gaging line on a boundary between the upper and the sole for shoe manufacturing, and generates trajectory data for the boundary based on the operation data. Based on the trajectory data, the gaging apparatus generates robot trajectory data for performing a buffing and bonding process after the gaging process and transmits it to a shoemaking robot.

20 Claims, 9 Drawing Sheets

(56) References Cited

U.S. PATENT DOCUMENTS

| | | | |
|---|---|---|---|
| 2014/0096403 A1* | 4/2014 | Regan | A43D 25/06 33/6 |
| 2015/0135447 A1* | 5/2015 | Jurkovic | A43D 1/08 12/51 |
| 2015/0182844 A1 | 7/2015 | Jang | |
| 2015/0189951 A1* | 7/2015 | Regan | A43D 5/00 12/103 |
| 2015/0201709 A1* | 7/2015 | Jurkovic | A43B 23/0255 12/18.5 |
| 2016/0128433 A1* | 5/2016 | Downing | A43D 8/28 264/400 |
| 2017/0105490 A1* | 4/2017 | Makover | A43B 3/0005 |
| 2019/0365054 A1* | 12/2019 | Chang | B25J 11/00 |

* cited by examiner

GAGING APPARATUS AND METHOD FOR AUTOMATION OF SHOEMAKING PROCESS

CROSS-REFERENCE TO RELATED APPLICATION

This application claims priority to and the benefit of Korean Patent Application Nos. 10-2018-0150074 filed in the Korean Intellectual Property Office on Nov. 28, 2018, and 10-2019-0149904 filed in the Korean Intellectual Property Office on Nov. 20, 2019, the entire contents of which are incorporated herein by reference.

BACKGROUND OF THE INVENTION

(a) Field of the Invention

The present invention relates to a gaging apparatus and method, and more particularly, to a gaging apparatus and method for automation of a shoemaking process.

(b) Description of the Related Art

The Fourth Industrial Revolution is called Industry 4.0, mainly in Europe, and it is also called the Fourth Industrial Revolution in which the Fourth Artificial Intelligence (AI) is strengthened in Korea. Industry 4.0 seeks to increase productivity and create new jobs by making labor-intensive manufacturing industries smart by integrating automation with artificial intelligence technologies. Among the manufacturing industries, the shoe manufacturing industry is a very labor-intensive. There is much to consider in terms of design of shoes. Depending on the type, color, material, and size of the shoe, the presence of a strap, the presence of an attachment, and even the process, considerations may vary, so many processes are required to make a single shoe. With so many process steps and manpower requirements, a smart shoe factory is indispensable for manufacturing innovation.

Recently, Adidas' Smart Factory has been a leader, and many companies are trying to automate the shoemaking process. As a result of this effort, many processes are automated and robots are introduced to increase productivity. However, not all equipment and processes are automated and performed by robots. This is because there are devices or facilities that can not yet be automated, or they are handled with human help. A typical example is a gaging process that forms a line at a part where a sole is joined to an upper in a shoemaking process for assembling an upper and a sole of a shoe.

In a smart factory, a gaging machine must be automated and replaced by a robot. However, currently, a person is directly involved in the gaging process, thus reducing productivity. Also, when a robot is used for the gaging process, the robot performs buffing and bonding along the line while recognizing the line drawn on the upper in the gaging process through visual recognition. However, when recognizing the lines through visual recognition, the line may not be recognized correctly, the line is erased in the process of buffing after gaging, or the line got stained with bond, which makes the recognition of the line inaccurate.

These errors are the cause of bad products. Related prior art is disclosed in the Republic of Korea Patent No. 1903433 "Method of extracting the upper outline of the sole for shoe sole automation".

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for automatically performing a gaging process in a shoemaking process.

An exemplary embodiment of the present invention provides a method for drawing a gaging line at a boundary between an upper and a sole of a shoe.

The method includes: obtaining, by a gaging apparatus, operation data according to performing a gaging process of drawing a gaging line at the boundary between the upper and the sole; generating, by the gaging apparatus, trajectory data for the boundary between the upper and the sole based on the operation data; performing, by the gaging apparatus, three-dimensional (3D) shaping of the trajectory data to obtain 3D shape values according to the gaging process; generating, by the gaging apparatus, robot trajectory data for performing a buffing and bonding process after the gaging process according to the 3D shape values; and transmitting, by the gaging apparatus, the robot trajectory data to a shoemaking robot performing the buffing and bonding process.

In an embodiment, the method may include obtaining a rotation value at which a fixed plate on which a last covered with the upper is placed is rotated during the gaging process, and the performing 3D shaping may include performing the 3D shaping using the trajectory data, the rotation value, and the operation data.

In an embodiment, the operation data may include first driving data that is a positioning value for height of the sole, second driving data that is a positioning value for a size of the shoe, an angle adjusting value corresponding to a depth of a groove of the boundary between the upper and the sole, and a force adjusting value representing a trajectory to the boundary between the upper and the sole.

In an embodiment, the generating trajectory data may include generating trajectory data for the boundary between the upper and the sole based on the force adjusting value.

In an embodiment, the performing 3D shaping may include: obtaining a thickness of the sole corresponding to the height of the sole based on the first driving data; obtaining the size of the shoe based on the second driving data; obtaining a shape of the sole based on the angle adjusting value; obtaining two-dimensional trajectory data by applying the rotation value to the trajectory data for the boundary between the upper and the sole; and obtaining 3D shape values based on the two-dimensional trajectory data, the thickness of the sole, the size of the shoe, and the shape of the sole.

In an embodiment, the first driving data may correspond to a driving amount of a line drawing unit of the gaging apparatus moving in a vertical direction so that the line drawing unit is positioned at the boundary between the upper and the sole in the gaging process, and the second driving data may correspond to a driving amount of the line drawing unit moving in a horizontal direction along the boundary between the upper and the sole.

In an embodiment, the angle adjusting value may include third driving data corresponding to a driving amount of an end of the line drawing unit moving up and down so that the line drawing unit is positioned at the groove of the boundary between the upper and the sole in the gaging process, and first sensing data corresponding to a force transmitted from the line drawing unit as the line drawing unit is located at the groove of the boundary between the upper and the sole, and the force adjusting value may include fourth driving data corresponding to a driving amount of the line drawing unit moving back and forth so that the line drawing unit presses the groove of the boundary between the upper and the sole to draw a gaging line, and second sensing data corresponding to a force transmitted from the line drawing unit as the line drawing unit moves back and forth.

In an embodiment, the method may include, after the obtaining of operation data, performing the gaging process for drawing the gaging line at the boundary between the upper and the sole. When the gaging process is performed, an arm unit connected to the line drawing unit of the gaging apparatus may move in a vertical direction and a horizontal direction so that the line drawing unit draws the gaging line along the boundary between the upper and the sole, and an angle adjusting unit connected to the line drawing unit may move the line drawing unit up and down so that the end of the line drawing unit is positioned at the groove of the boundary, while a force adjusting unit connected to the line drawing unit may move the line drawing unit back and forth so that the end of the line drawing unit presses the groove to draw the gaging line.

In an embodiment, the first driving data may correspond to a driving amount according to movement of the arm unit in the vertical direction, the second driving data may correspond to a driving amount according to movement of the arm unit in the horizontal direction, the third driving data may correspond to a driving amount in which the angle adjusting unit moves the line drawing unit up and down, the first sensing data may correspond to a force acting from the line drawing unit to the angle adjusting unit, the fourth driving data may correspond to a driving amount in which the force adjusting unit moves the line drawing unit back and forth, and the second sensing data may correspond to a force acting from the line drawing to the force adjusting unit.

Another embodiment of the present invention provides a gaging apparatus for drawing a gaging line at a boundary between an upper and a sole of a shoe. The gaging apparatus includes: an operation data receiver configured to obtain operation data according to performing a gaging process of drawing a gaging line at the boundary between the upper and the sole; and a data processor configured to generate trajectory data for the boundary between the upper and the sole based on the operation data, perform three-dimensional (3D) shaping of the trajectory data to obtain 3D shape values according to the gaging process, generate robot trajectory data for performing a buffing and bonding process after the gaging process according to the 3D shape values, and transmit the robot trajectory data to a shoemaking robot performing the buffing and bonding process.

In an embodiment, the gaging apparatus may include a last fixing unit configured to obtain a rotation value at which a fixed plate on which a last covered with the upper is placed is rotated during the gaging process, wherein the data processor may be configured to perform the 3D shaping using the trajectory data, the rotation value and the operation data.

In an embodiment, the operation data may include first driving data that is a positioning value for height of the sole, second driving data that is a positioning value for a size of the shoe, an angle adjusting value corresponding to a depth of a groove of the boundary between the upper and the sole, and a force adjusting value representing a trajectory to the boundary between the upper and the sole.

In an embodiment, the data processor may include: a trajectory calculation unit configured to generate trajectory data for the boundary between the upper and the sole based on the force adjusting value; a 3D shaping unit configured to obtain a thickness of the sole corresponding to the height of the sole based on the first driving data, obtain the size of the shoe based on the second driving data, obtain a shape of the sole based on the angle adjusting value, obtain two-dimensional trajectory data by applying the rotation value to the trajectory data for the boundary between the upper and the sole, and obtain 3D shape values based on the two-dimensional trajectory data, the thickness of the sole, the size of the shoe, and the shape of the sole; a robot trajectory generation unit configured to generate the robot trajectory data for performing the buffing and bonding process after the gaging process according to the 3D shape values; and a data transferring unit configured to transfer the robot trajectory data to the shoemaking robot.

In an embodiment, the gaging apparatus may include a gaging driving unit for automatically performing the gaging process, wherein the gaging driving unit may include: a line drawing unit; an arm unit connected to the line drawing unit and configured to move in a vertical direction and a horizontal direction so that the line drawing unit draws a gaging line along the boundary between the upper and the sole; an angle adjusting unit connected to the line drawing unit and configured to move the line drawing unit up and down so that the line drawing unit is positioned at the groove of the boundary; and a force adjusting unit connected to the line drawing unit and configured to move the line drawing unit back and forth so that the line drawing unit presses the groove to draw the gaging line.

In an embodiment, the gaging apparatus may include a measurement unit configured to measure data according to driving of the gaging driving unit, wherein the measurement unit may include: a first driving measurement unit configured to measure first driving data which is a driving amount according to movement of the arm unit in a vertical direction and second driving data which is a driving amount according to movement of the arm unit in a horizontal direction; a second driving measurement unit configured to measure third driving data corresponding to a driving amount in which the angle adjusting unit moves the line drawing unit up and down, and first sensing data corresponding to a force acting from the line drawing to the angle adjusting unit; and a third driving measurement unit configured to measure fourth driving data corresponding to a driving amount in which the force adjusting unit moves the line drawing unit back and forth and second sensing data corresponding to a force acting from the line drawing to the force adjusting unit.

In an embodiment, the data processor may be configured to generate trajectory data for the boundary between the upper and the sole based on the fourth driving data and the second sensing data, obtain a thickness of the sole corresponding to a height of the sole based on the first driving data, obtain a size of the shoe based on the second driving data, and obtain a shape of the sole based on the third driving data and the first sensing data to obtain the 3D shape values.

In an embodiment, the second driving measurement unit may include a pressure sensor measuring the first sensing data, and a value of a parameter used in operation of the pressure sensor is set differently according to types of shoes undergoing the gaging process.

In an embodiment, the line drawing unit may include: an inner shim connected to the angle adjusting unit and the force adjusting unit; an end connected to the inner shim to draw the gaging line; and an outer body covering the inner shim and the end.

DETAILED DESCRIPTION OF THE EMBODIMENTS

Figure 1:
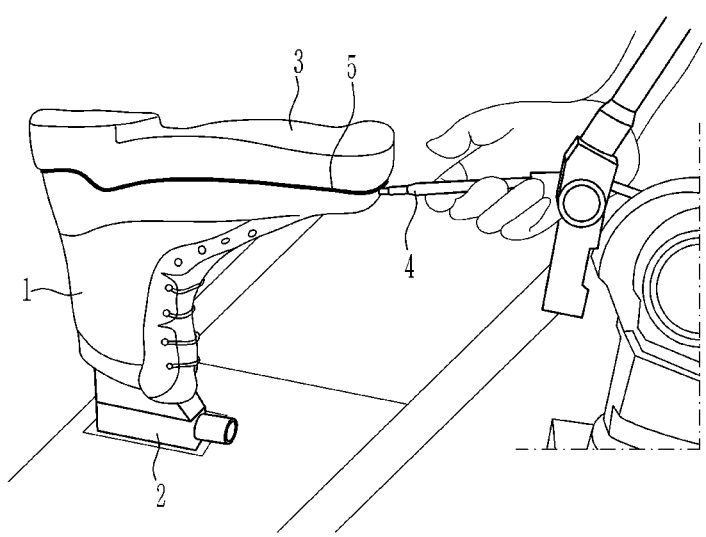
FIG. 1 is an exemplary diagram illustrating a gaging process.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In the drawings, parts that are irrelevant to the description are omitted in order to clearly describe the present invention, and like reference numerals designate like parts throughout the specification.

Throughout the specification, in addition, unless explicitly described to the contrary, the word "comprise" and variations such as "comprises" or "comprising" will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component. In addition, terms including ordinal numbers such as first and second used in embodiments of the present invention may be used to describe components, but the components should not be limited by the terms.

Hereinafter, a gaging apparatus and method for automating a shoemaking process according to an exemplary embodiment of the present invention will be described.

In the shoemaking process of assembling the upper and sole of a shoe, the gaging process is a process of forming a line for the part where the sole is joined to the upper. In order to assemble the upper and the sole made in a separate production line, the upper is inserted into the last (also called a shoe bone) so that the appearance is not deformed, the last with the upper is fixed upside down on a gaging equipment in a gaging process, the sole made to fit the size of a shoe is put on the last, and then pressure is applied up and down to keep the sole from moving.

FIG. 1 is an exemplary diagram illustrating a gaging process.

Equipment for the gaging process as illustrated in FIG. 1 is used in a smart shoe manufacturing line. An upper is covered on a last 1, and then they are mounted upside down on a last fixed portion 2 of the equipment for gaging, as shown in FIG. 1. A sole 3 made to fit the size of a shoe is put on them. A lower plate of the last fixed portion 2 (not shown) moves up to apply a constant force on a top plate (not shown) to fix the sole 3.

Human help is needed to form the line for the part where the sole is joined to the upper. For this purpose, as shown in FIG. 1, when a worker in charge of the gaging process places a tool 4 for drawing a line at a boundary portion 5 of the upper and the sole, the whole last 1 fixed upside down is rotated and a line is drawn on the boundary part 5 according to the strength and weakness of the worker's power.

After this, in the gaging process, a shoemaking robot (not shown) performs a buffing operation for roughly grinding a surface with a grinder and then bonds along the line. The shoemaking robot then attaches the bonded upper and sole to each other.

In the gaging process of the shoemaking process of assembling the upper and the sole of the shoe, it is still necessary to draw a line by a person with a tool for drawing a gaging line. In addition, the shoemaking robot must recognize the gaging line drawn manually by a person through visual recognition, and perform a buffing operation to grind the upper with the grinder so that the upper is well bonded based on the recognized gaging line. However, when a person draws a gaging line, it becomes difficult to draw the gaging line with a certain pressure, and then a buffing operation is performed by recognizing the gaging line that is not accurately drawn through visual recognition. As a result, an error occurs in the buffing operation by the shoemaking robot.

An embodiment of the present invention provides an apparatus and method for automating a gaging process. For this purpose, the drawing of a gaging line is automatically performed in the gaging process, and data for a buffing and bonding operation performed after the gaging process is generated based on the data according to the gaging process.

Figure 2:
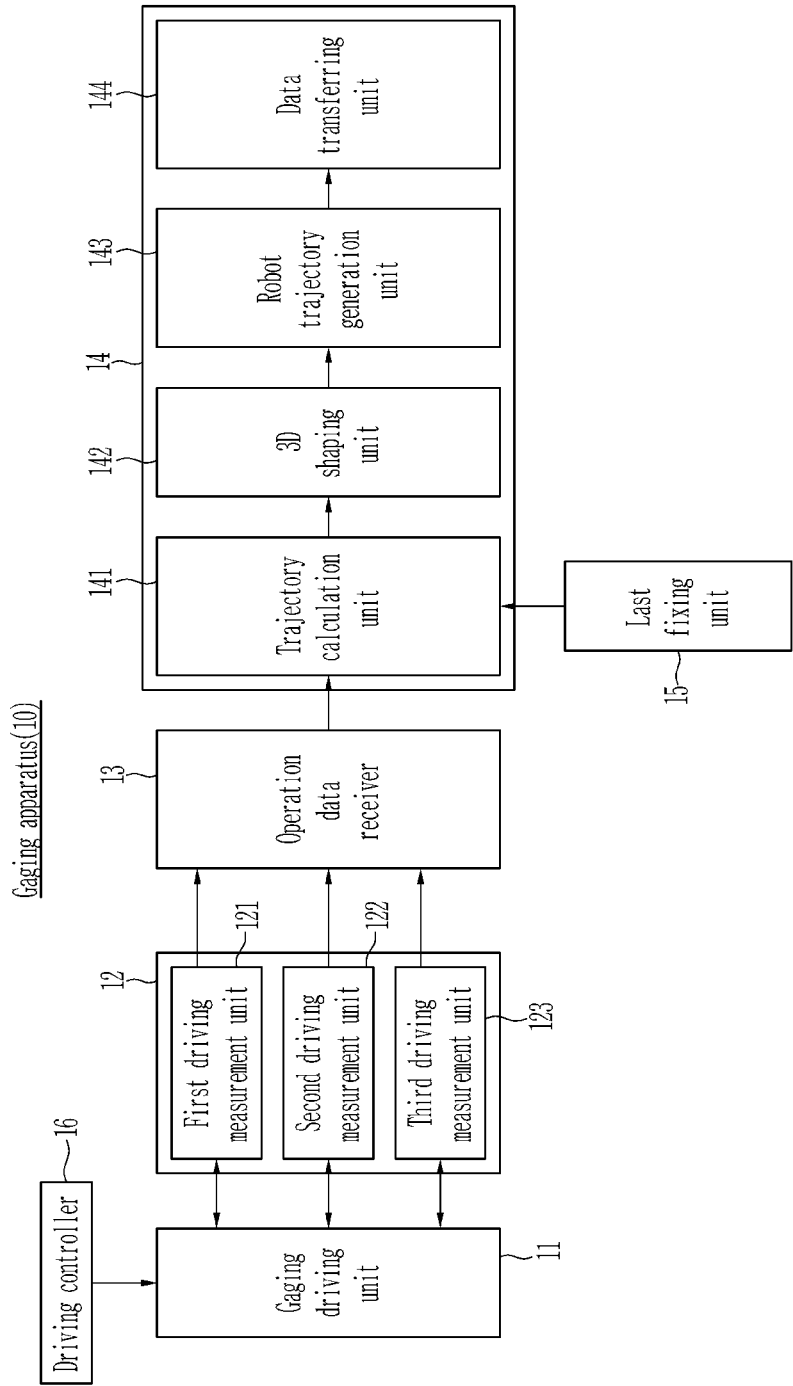
FIG. 2 is a structural diagram of a gaging apparatus according to an embodiment of the present invention.

FIG. 2 is a structural diagram of a gaging apparatus according to an embodiment of the present invention.

A gaging apparatus 10 according to an embodiment of the present invention performs a gaging process of forming a line for joining an upper and a sole in a shoe production line for assembling the upper and the sole produced in each production manufacturing line. To this end, as shown in FIG. 2, the gaging apparatus 10 according to an exemplary embodiment of the present invention includes a gaging driving unit 11 for performing a gaging process for drawing a gaging line, a measurement unit 12 for measuring operation data according to the gaging process, an operation data receiver 13 for receiving the operation data from the measurement unit 12, and a data processor 14 for generating data for a buffing and bonding operation based on the operation data. In addition, the gaging apparatus 10 further includes a last fixing unit 15 that provides the data processor 14 with rotation-related data of a fixed plate (e.g., a last fixed portion) for fixing the last in the gaging process. In addition, the gaging apparatus 10 further includes a driving controller 16 for driving the gaging driving unit 11 to draw a gaging line.

The gaging driving unit 11 performs a gaging process of drawing a line, that is, a gaging line, at which the upper and the sole are to be joined. For example, in the state in which the upper covered last is mounted upside down on a last fixed portion as shown in FIG. 1, the gaging driving unit 11 automatically draws a gaging line for the part where the sole is joined to the upper (for example, the boundary between the upper and the sole).

Figure 3:
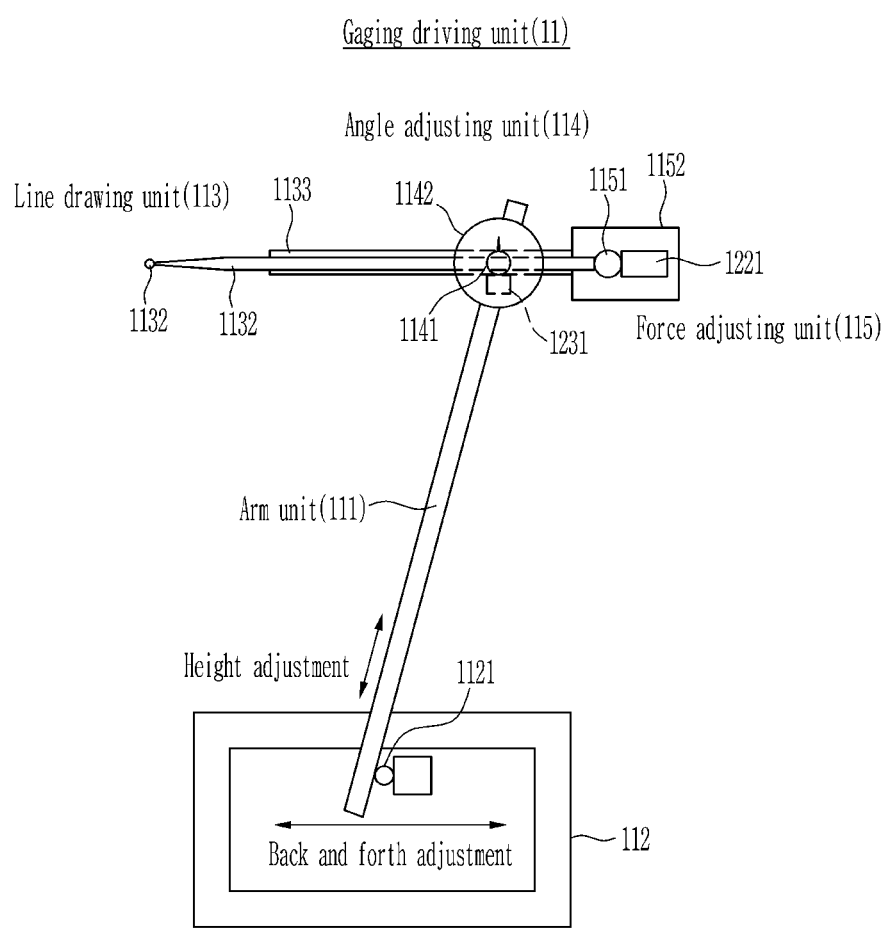
FIG. 3 is an example illustrating the structure of a gaging driving unit according to an embodiment of the present invention.

FIG. 3 show an example of the structure of a gaging driving unit according to an embodiment of the present invention.

The gaging driving unit 11 includes an arm unit 111, an arm adjusting unit 112, a line drawing unit 113, an angle adjusting unit 114, and a force adjusting unit 115. The arm unit 111 is connected to the line drawing unit 113, and the line drawing unit 113 is interlocked according to the vertical and horizontal movement of the arm unit 111. In addition, the angle adjusting unit 114 that adjusts the angle of the line drawing unit 113 and the force adjusting unit 115 that adjusts force for the line drawing unit 113 may also be interlocked to the arm unit 111.

The arm unit 111 enables the adjustment of the height and position of the line drawing unit 113 while simultaneously supporting the line drawing unit 113, the angle adjusting unit 114, and the force adjusting unit 115. The width of the movement of the line drawing unit 113, the angle adjusting unit 114, and the force adjusting unit 115 may vary depending on the length of the arm unit 111.

The arm adjusting unit 112 adjusts the arm unit 111 so that the line drawing unit 113 can accurately contact with the boundary part between the upper and the sole while simultaneously supporting the arm unit 111, the line drawing unit 113, the angle adjusting unit 114, and the force adjusting unit 115.

The arm adjusting unit 112 is configured to adjust the height of the arm unit 111 by moving the arm unit 111 in the vertical direction and adjust the front and rear movement of the arm unit 111 by moving the arm unit 111 in the horizontal direction.

Figure 4A:
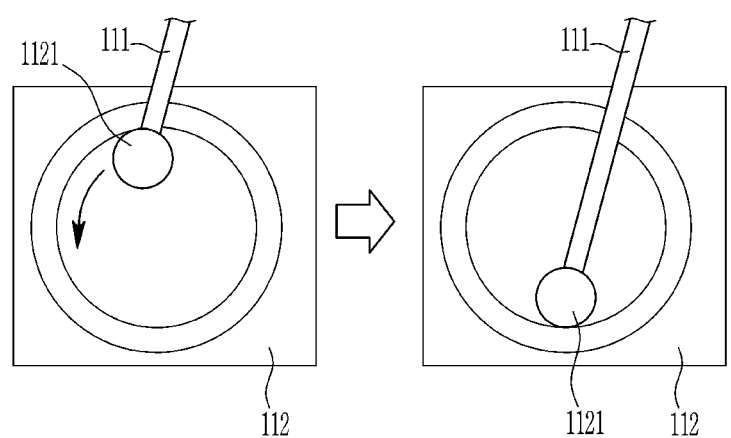
FIG. 4A and FIG. 4B are exemplary diagrams illustrating the operation of the arm adjusting unit of the gaging apparatus according to the embodiment of the present invention.
Figure 4B:
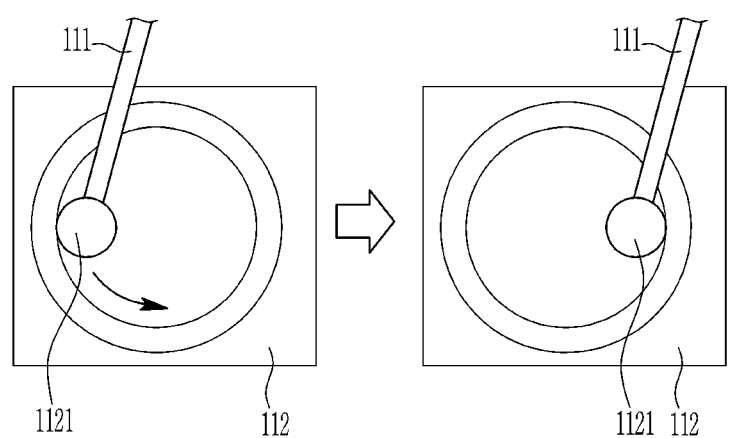

FIG. 4A and FIG. 4B are exemplary diagrams illustrating the operation of the arm adjusting unit of the gaging apparatus according to the embodiment of the present invention.

The arm adjusting unit 112 includes a motor 1121 to allow the arm unit 111 to move in the vertical direction or the horizontal direction. As illustrated in FIG. 4A, the arm unit 111 moves in the vertical direction according to the driving of the motor 1121. Accordingly, the height of the arm unit 111 is adjusted so that the line drawing unit 113 connected to the arm unit 111 may be positioned at a target object, that is, the part where the sole is joined to the upper (see FIG. 1). In addition, as illustrated in FIG. 4B, the arm unit 111 moves in the horizontal direction according to the driving of the motor 1121. Accordingly, the front and rear movement of the arm unit 111 is adjusted so that the line drawing unit 113 connected to the arm unit 111 may be moved back and forth along the part where the sole is joined to the upper (see FIG. 1).

The arm adjusting unit 112 may be implemented in various forms to move the arm unit 112 in the vertical direction and the horizontal direction, respectively. For example, the motor 1121 may be a plurality of motors. For example, the arm controller 112 may be configured to include a first motor for vertical movement of the arm unit 111 and a second motor for horizontal movement of the arm unit 111. In this case, a plurality of cogs may be connected to the first motor and the second motor, and the arm unit 111 may move in the vertical direction or the horizontal direction by the cogs. The structure of the arm adjusting unit is not limited to this.

In addition, the arm adjusting unit may have an internal space in which the arm unit 111 can sufficiently move up and down and back and forth. In the gaging process, since the plate fixing the upper covered last moves up and down, the arm adjusting unit does not require much movement. Therefore, the arm adjusting unit 112 may be minimized by securing a space for moving a predetermined section.

Meanwhile, as illustrated in FIG. 3, the line drawing unit 113 includes an inner shim 1131, an end portion 1132 connected to the inner shim 1131, and an outer body 1133 for covering the inner shim 1131. The outer body 1133 may be in the form of a tube so that the inner shim 1131 moves back and forth inside it. The inner shim 1131 moves back and forth in the interior of the outer body 1133 so that the end portion 1132 can reach a groove of the boundary part between the upper and the sole. The end portion 1132 is configured to draw a gaging line along the groove of the boundary part between the upper and the sole when touching the groove.

The angle adjusting unit 114 is connected to the inner shim 1131 of the line drawing unit 113 to allow the inner shim 1131 to move in the vertical direction. To this end, as shown in FIG. 3, the angle adjusting unit 114 includes a motor 1141 that is connected to the inner shim 1131 to allow the inner shim 1131 to move up and down, and a case 1142 for covering the motor 1141.

The force adjusting unit 115 is connected to the inner shim 1131 of the line drawing unit 113 to allow the inner shim 1131 to move in the horizontal direction. To this end, as shown in FIG. 3, the force adjusting unit 115 includes a motor 1151 which is connected to the inner shim 1131 and moves the inner shim 1131 back and forth and a case 1152 covering the motor 1151.

Figure 5A:
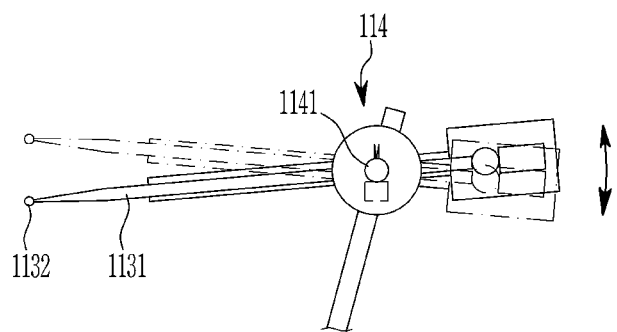
FIG. 5A and FIG. 5B are an exemplary diagram illustrating the operation of the angle adjusting unit and the force adjusting unit of the gaging apparatus according to an embodiment of the present invention.
Figure 5B:
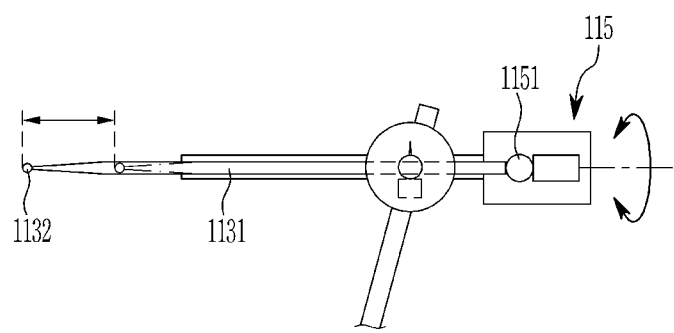

FIG. 5A and FIG. 5B are exemplary diagrams illustrating the operation of the angle adjusting unit and the force adjusting unit of the gaging apparatus according to an embodiment of the present invention.

As illustrated in FIG. 5A, the inner shim 1131 of the line drawing unit 113 moves up by interlocking with the driving (e.g., rotation in a first direction) of the motor 1141 of the angle adjusting unit 114, or moves down by interlocking with the driving (e.g., rotation in a second direction) of the motor 1141 of the angle adjusting unit 114. The line drawing unit 113 is moved up and down according to the driving of the motor 1141, and the motor 1141 is driven to finely adjust the movement of the line drawing unit 113 up and down. Accordingly, the angle of the end portion 1132 of the line drawing unit 113 is changed. When the end portion 1132 of the line drawing unit 113 moves up or down and touches the boundary part between the upper and the sole, there is a raised spot due to the height difference in the boundary part, and the end portion 1132 of the line drawing unit 113 is placed at a groove in the raised spot.

Meanwhile, as illustrated in FIG. 5B, the inner shim 1131 of the line drawing unit 113 moves forward by interlocking with the driving (e.g., rotation in a first direction) of the motor 1151 of the force adjusting unit 115 or moves backward by interlocking with the driving (e.g., rotation in a second direction) of the motor 1151 of the force adjusting unit 115. As the inner shim 1131 of the line drawing unit 113 is moved forward, the end portion 1132 connected to the inner shim 1131 meets the groove of the boundary part between the upper and the sole. When the end portion 1132 is fixed to the groove of the boundary part, the motor 1151 is driven so that the end portion 1132 can draw the gaging line by pressing the groove of the boundary part with a constant force.

The angle adjusting unit 114 and the force adjusting unit 115 may be implemented in various forms to move the line drawing unit 113 as describe and their structures are not limited to this.

On the other hand, the measurement unit 12 measures the data according to the gaging process performed by the gaging driving unit 11 operating as described above. To this end, as shown in FIG. 2, the measurement unit 12 may include a first driving measurement unit 121 for measuring driving data according to the driving of the arm adjusting unit 112 of the gaging driving unit 11, a second driving measurement unit 122 for measuring driving data according to the driving of the angle adjusting unit 114 of the gaging driving unit 11, and a third driving measurement unit 123 for measuring driving data according to the driving of the force adjusting unit 115 of the gaging driving unit 11 of the gaging driving unit 11.

The first driving measurement unit 121 measures first driving data corresponding to the arm adjusting unit 112 moving the arm unit 111 in the vertical direction, and second driving data corresponding to the arm adjusting unit 112 moving the arm unit 111 in the horizontal direction. For example, the first driving data corresponds to the driving amount of the motor 1121 of the arm adjusting unit 112 when the arm unit 111 moves in the vertical direction, and is also referred to as a first motor adjusting value. The second driving data corresponds to the driving amount of the motor 1121 of the arm adjusting unit 112 when the arm unit 111 moves in the horizontal direction, and is also referred to as a second motor adjusting value.

The second driving measurement unit 122 measures third driving data corresponding to the angle adjusting unit 114 moving the inner shim 1131 of the line drawing unit 113 up and down, and first sensing data corresponding to the force obtained from the inner shim 1131 (for example, the force acting on the angle adjusting unit 114 from the inner shim 1131). The third driving data corresponds to the driving amount of the motor 1141 of the angle adjusting unit 114.

The first sensing data corresponds to the force obtained from the inner shim 1131 of the line drawing unit 113. In order to measure the first sensing data, the second driving measurement unit 122 may include a pressure sensor 1221 (see FIG. 3). The pressure sensor 1221 senses the force transmitted from the line drawing unit 113 so that the end portion 1132 draws the gaging line at a constant pressure along the groove of the boundary between the upper and the sole. The motor 1141 may be adjusted according to the change in the value of the force such that the end portion 1132 of the line drawing unit 113 follows the groove of the boundary between the upper and the sole in real time based on the sensed force. The value of the parameter used when sensing the value corresponding to the force obtained from the inner shim 1131 by the pressure sensor 1221 may be set differently according to the type of shoes. For example, for military boots, the boundary between the upper and the sole is narrow and the groove is deep, so the gaging line can be drawn well even if a pressure value of the parameter is increased. However, for women's boots, the boundary between the upper and the sole is narrow and the groove is not deep, so a high pressure can cause the gaging line to rise to the upper rather than the groove of the boundary. In consideration of this, a parameter value of the pressure sensor 1121 can be set.

The third driving measurement unit 123 measures fourth driving data corresponding to the force adjusting unit 115 moving the inner shim 1131 of the line drawing unit 113 back and forth, and second sensing data corresponding to the force obtained from the inner shim 1131. The third driving data corresponds to the driving amount of the motor 1151 of the angle adjusting unit 115. The second sensing data corresponds to the force obtained from the inner shim 1131 of the line drawing unit 113. In order to measure the second sensing data, the third driving measurement unit 123 may include a force sensor 1231 (see FIG. 3).

Measuring the driving amount of the motor in the measurement unit 12 of this structure can be performed using various techniques known in the art.

Meanwhile, the third driving data according to the driving of the angle adjusting unit 114 and the first sensing data measured by the second driving measurement unit 122 may be used as an angle adjusting value, and the fourth driving data according to the driving of the force adjusting unit and the second sensing data measured by the third driving measurement unit 123 may be used as a force adjusting value.

As the plate for fixing the last (e.g., a last fixed portion in FIG. 1) rotates according to the force adjusting value, the driving amount of the motor for moving the inner shim 113 of the line drawing unit 113 back and forth can be known. The force adjusting value may be used to represent the trajectory of the boundary between the upper and the sole.

The angle adjusting value is a measure of a boundary gap of the upper and the sole, that is, the depth of the groove of the boundary between the upper and the sole. In other words, the thickness of the sole may be deep so that the groove, which can be regarded as a boundary gap, may be deep, or the thickness of the sole may be thin so that the groove may be shallow. This angle adjusting value may affect a parameter value used for the buffing and bonding operation performed by a shoemaking robot. The angle adjusting value may be set so that the line drawing unit 113 faces slightly upward rather than horizontal. In order for the line drawing unit 113 to draw the gaging line accurately and fixedly touching the groove of the boundary between the upper and the sole, the end portion 1132 of the line drawing unit 113 may be adjusted to be slightly upward rather than horizontal.

On the other hand, the first driving data of the first driving measurement unit 121 corresponds to the height adjustment amount according to the movement of the arm unit 111 up and down, which depends on the height of the heel corresponding to the sole. The second driving data of the first driving measurement unit 121 corresponds to the adjustment amount according to the movement of the arm unit 111 back and forth, which varies depending on the size of the shoe.

For high-heeled shoes, the height of the arm unit 111 is adjusted to be low so that the line drawing unit 113 is positioned at the boundary between the upper and the sole. For low-heeled shoes, the height of the arm unit 111 is adjusted to be higher so that the line drawing unit 113 is positioned at the boundary between the upper and the sole. In addition, if the size of the shoe is large, the front and rear adjustment of the arm unit 111 is reduced so that the line drawing unit 113 moves by the size of the shoe to draw a gaging line on the boundary between the upper and the sole. If the size of the shoe is small, the front and rear movement of the arm unit 111 is increased so that the line drawing unit 113 moves by the size of the shoe to draw a gaging line on the boundary between the upper and the sole. Accordingly, the first driving data and the second driving data may correspond to a positioning value for the height of the sole and a positioning value for the size of the shoe, respectively.

The drive controller 16 may obtain a positioning value for the height of the sole, a positioning value for the size of the shoe, an angle adjusting value, a force adjusting value, and the like according to the first to fourth driving data and the first and second sensing data to drive the gaging driving unit 11.

Meanwhile, the operation data receiver 13 receives data transmitted from the measurement unit 12 to obtain operation data according to the gaging process, and transfers the operation data to the data processor 14. Here, the operation data includes the first to fourth driving data and the first and second sensing data provided from the measurement unit 12.

The operation data receiver 13 may receive correct values in real time, and may use a serial communication interface such as, for example, RS-232 or RS-485.

On the other hand, the last fixing unit 15 is configured to transmit, to the data processor 14, a rotation value of the plate (e.g., a last fixed portion) while the gaging line is being drawn at the boundary between the upper and the sole in the state of the last fixed.

On the other hand, the data processor 14 is configured to generate data for subsequent process execution based on the operation data related to the gaging process from the operation data receiver 13 and the rotation value provided from the last fixing unit 15. That is, the data processor 14 calculates trajectory data based on the operation data provided from the operation data receiver 13, performs three-dimensional (3D) shaping for the boundary between the upper and the sole based on the trajectory data and the rotation value obtained from the last fixing unit 15, and generates robot trajectory data that allows a shoemaking robot (not shown) to buff and bond according to the 3D shaping.

To this end, as illustrated in FIG. 2, the data processor 14 includes a trajectory calculation unit 141, a 3D shaping unit 142, a robot trajectory generation unit 143, and a data transferring unit 144.

The trajectory calculation unit 141 is configured to calculate trajectory data for the boundary between the upper and the sole. In detail, the trajectory calculation unit 141 calculates trajectory data on the boundary between the upper and the sole according to the fourth driving data and the second sensing data corresponding to the force adjusting unit 115 (these correspond to the force adjusting value) among the operation data.

The 3D shaping unit 142 is configured to perform 3D shaping on the trajectory data calculated by the trajectory calculation unit 141. The trajectory data calculated by the trajectory calculation unit 141 is not a three-dimensional value. Therefore, three-dimensional values need to be calculated. To this end, the 3D shaping unit 142 obtains the height of the heel, that is, the thickness of the sole and the size of the shoe, respectively, according to the first driving data and the second driving data related to the arm adjusting unit 112. The first driving data and the second driving data may be calculated as values for an X axis and a Y axis in a 3D coordinate system, the value for the X axis corresponds to the position of the boundary between the upper and the sole according to the size of the shoe, and the value for the Y axis corresponds to the height of the heel. Then, a value of a Z axis may be calculated by at least one of the third and fourth driving data and the first and second sensing data.

In addition, the 3D shaping unit 142 obtains the shape of the sole according to the third driving data and the first sensing data (these correspond to the angle adjusting value) of the angle adjusting unit 114. Since the angle of the line drawing unit 113 is adjusted by the angle adjusting unit 114 along the boundary between the upper and the sole, the shape of the sole may be obtained according to the third driving data corresponding to the driving amount of the motor 1141 of the angle adjusting unit 114 and the first sensing data sensed by the pressure sensor 1221. The upper side of the sole has a curved shape rather than a constant section.

The trajectory data for the boundary between the upper and the sole calculated according to the fourth driving data and the second sensing data corresponding to the force adjusting unit 115 is one-dimensional data. The 3D shaping unit 142 may obtain two-dimensional data for the boundary between the upper and the sole by using the rotation value transferred from the last fixing unit 15. That is, two-dimensional trajectory data is obtained by applying the rotation value to the trajectory data.

Next, the 3D shaping unit 142 obtains 3D shape values in consideration of the three-dimensional gaging line and the sole height by using all the data obtained above. That is, 3D shape values are obtained based on the two-dimensional trajectory data, the thickness of the sole, the size of the shoe, and the sole shape. The 3D shape values thus obtained are utilized as input data of a process for buffing and bonding by a shoemaking robot.

On the other hand, the robot trajectory generation unit 143 generates robot trajectory data for the shoemaking robot to perform the buffing and bonding process along the gaging line by using the 3D shape values obtained by the 3D shaping unit 142. The robot trajectory data corresponds to data of a path through which the shoemaking robot can move in the buffing and bonding process.

Buffing is a process of grinding the upper with a grinder without damaging the gaging line. Buffing is to ensure good adhesion with the sole when bonded. Bonding may be performed by spraying a bonding material in the form of a spray or painting the bonding material by a shoemaking robot. Recently, the spraying has been widely used. When bonding, it is very important to bond the gaging line so that it does not cross the boundary of the gaging line. To do this, accurate data about the gaging line as input data is an important factor in reducing errors and ultimately reducing a defective rate of products. In consideration of this, the robot trajectory generation unit 143 generates the robot trajectory data for a shoemaking robot to perform a buffing and bonding process along the gaging line according to the 3D shape values obtained by the 3D shaping unit 142.

The data transferring unit 144 transfers the robot trajectory data to a shoemaking robot (not shown).

According to this embodiment of the present invention, in performing the gaging process, a gaging line is automatically drawn on the boundary between the upper and the sole, and values for the trajectory for drawing the gaging line are obtained to generate robot trajectory data for a shoemaking robot to perform a buffing and bonding process. Therefore, errors in the gaging process and the buffing and bonding process can be minimized, thereby significantly reducing the defective rate of products.

Figure 6:
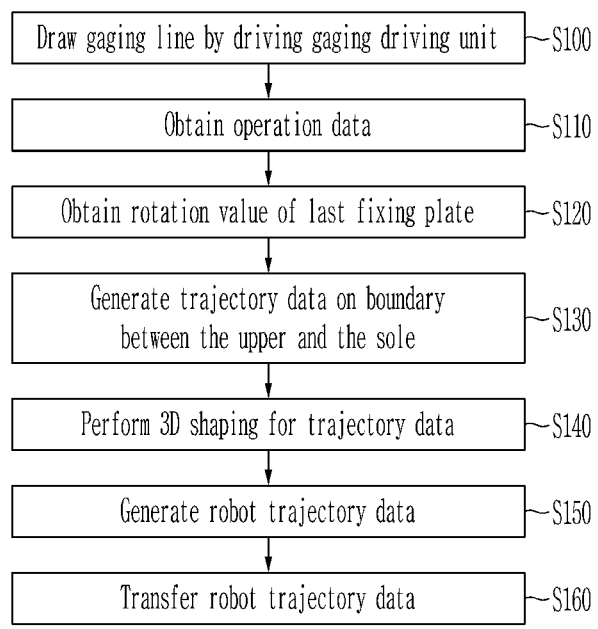
FIG. 6 is a flowchart of a gaging method according to an embodiment of the present invention.

FIG. 6 is a flowchart of a gaging method according to an embodiment of the present invention.

The upper of a shoe is inserted into a last for the shoe, the last with the upper is fixed upside down on a last fixed portion of a gaging equipment, the sole made to fit the size of the shoe is put on the last, and then pressure is applied up and down by moving a fixed plate at the bottom of the last fixed portion up to keep the sole from moving (in this case, a separate plate may be positioned at the top of the sole to press the sole).

In this state, the gaging apparatus 10 according to the embodiment of the present invention automatically draws a gaging line on the boundary between the upper and the sole (S100). The arm adjusting unit 112, the angle adjusting unit 114, and the force adjusting unit 115 are driven so that the line drawing unit 113 draws a gaging line. Specifically, the movement of the arm unit 111 in the vertical direction is adjusted by driving the arm adjusting unit 112 so that the end portion 1132 of the line drawing portion 113 connected to the arm unit 111 is positioned at the boundary between the upper and the sole. The inner shim 1131 of the line drawing unit 113 connected to the force adjusting unit 115 moves back and forth by driving the force adjusting unit 115, and the inner shim 1131 of the line drawing unit 113 connected to the angle adjusting unit 114 moves up and down by driving the angle adjusting unit 114, so that the end portion 1132 of the line drawing unit 113 is in contact with a groove of the boundary between the upper and the sole. In this state, the arm adjusting unit 112 is driven to move the arm unit 111 back and forth so that the end portion 1132 of the line drawing unit 113 moves back and forth along the groove of the boundary between the upper and the sole in conjunction with the arm unit 111. Accordingly, the end portion 1132 of the line drawing unit 113 draws a gaging line along the groove of the boundary between the upper and the sole in conjunction with the arm unit 111.

The gaging apparatus 10 obtains operation data according to the driving of the angle adjusting unit 114, the force adjusting unit 114, and the arm adjusting unit 112 in the process of drawing a gaging line (S110). In detail, the first and second driving data according to the driving of the arm adjusting unit 112, the third driving data and the first sensing data according to the driving of the angle adjusting unit 114, and the fourth driving data and the second sensing data according to the driving of the force adjusting unit 115 are obtained.

In addition, the gaging apparatus 10 obtains a rotation value at which the plate fixing the last rotates while drawing a gaging line at the boundary between the upper and the sole (S120).

Thereafter, the gaging apparatus 10 calculates trajectory data for the boundary between the upper and the sole according to the fourth driving data and the second sensing data corresponding to the force adjusting unit 115 (these correspond to the force adjusting value) (S130). Then, 3D shaping of the calculated trajectory data is performed (S140).

In 3D shaping, specifically, the thickness of the sole (i.e., the height of the heel) and the size of the shoe are obtained according to the first and second driving data corresponding to the arm adjustment unit 112. The shape of the sole is obtained according to the third driving data and the second sensing data corresponding to the angle adjusting unit 114 (these correspond to the angle adjusting values). Then, the rotation value is applied to the trajectory data to obtain two-dimensional trajectory data. Next, 3D shaping is performed based on the two-dimensional trajectory data, the thickness of the sole, the size of the shoe, and the shape of the sole to obtain 3D shape values.

Next, according to the 3D shape values, the robot trajectory data for performing a buffing and bonding process along the gaging line by a shoemaking robot is generated (S150). Thereafter, the gaging apparatus 10 transmits the generated robot trajectory data to the shoemaking robot (not shown) (S160).

Conventionally, the shoemaking robot recognizes a line drawn in a gaging process using a recognition technology using a camera (for example, visual recognition) to perform a process after the gaging process. Accordingly, when the drawn line is erased or blurred, an error of recognition occurs, which causes an error in a process performed by the shoemaking robot, that is, buffing and bonding, and increases a defective rate of the product. In addition, expensive equipment is used for visual recognition.

However, according to the embodiment of the present invention as described above, the gaging process is performed automatically, the operation data related to the gaging process that is automatically performed is collected, and the trajectory data related to the 3D path is generated using the collected operation data and provided to the shoemaking robot, so that the shoemaking robot performs a buffing and bonding process. As a result, by removing the visual recognition technology required by the shoemaking robot and reducing the error, a more economical and accurate process can be achieved.

Figure 7:
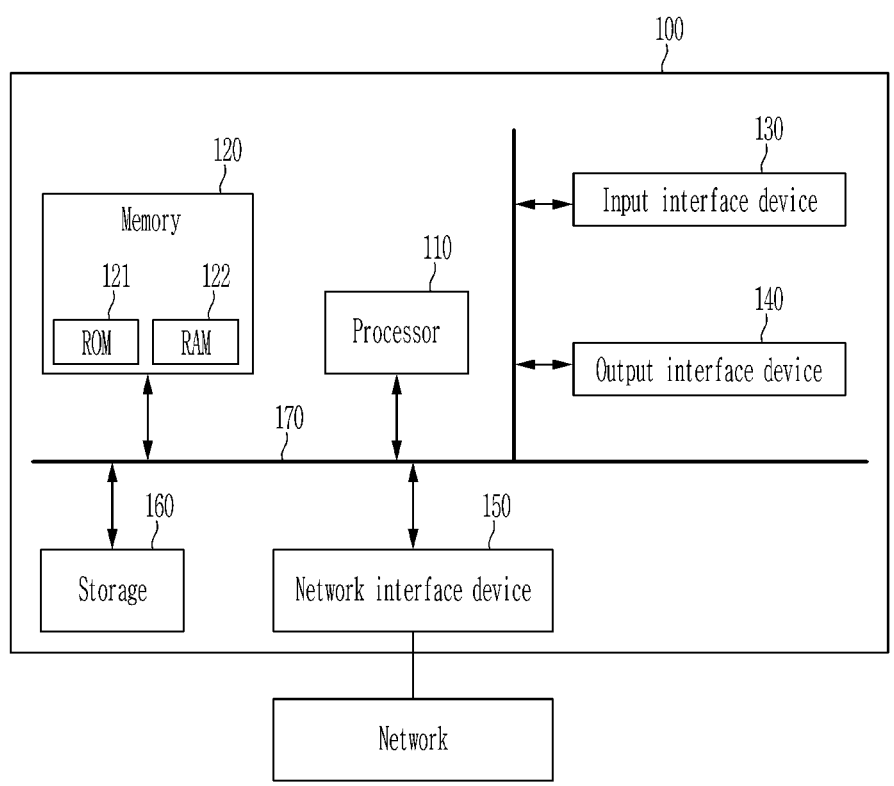
FIG. 7 is a structural diagram of a gaging apparatus according to another embodiment of the present invention.

FIG. 7 is a structural diagram of a gaging apparatus according to another embodiment of the present invention.

As shown in FIG. 7, the gaging apparatus 100 according to an embodiment of the present invention includes a processor 110, a memory 120, an input interface device 130, an output interface device 140, a network interface device 150, and a storage 160, which can communicate via a bus 170.

The processor 110 may be configured to implement the methods described with reference to FIGS. 2 to 6 above. For example, the processor 110 may be configured to perform the function of the data processor.

The processor 110 may be a central processing unit (CPU) or a semiconductor device that executes instructions stored in the memory 120 or the storage 160.

The memory 120 is connected to the processor 110 and stores various information related to the operation of the processor 110. The memory 120 may store instructions for execution in the processor 110 or temporarily load the instructions from the storage 160. The processor 110 may execute instructions stored or loaded in the memory 120. The memory may include a ROM 121 and a RAM 122.

In an embodiment of the present disclosure, the memory 120 and the storage 160 may be located inside or outside the processor 110, and may be connected to the processor 110 through various known means.

The input interface device 130 may be configured to receive input data and transfer the received data to the processor 111. For example, the input interface device 130 may be configured to perform the function of the operation data receiver described above.

The output interface device 140 may be configured to output the processing result of the processor 110.

The network interface device 150 may be configured to receive data through a network and transfer the received data to the processor 110, or transmit the processing result of the processor 110 to another device through a network. For example, the network interface device 150 may be configured to perform the function of the operation data receiver and to perform the function of the data transferring unit.

According to an embodiment of the present invention, it is possible to automate a gaging process. Data according to the automatic gaging process is collected in real time, two-dimensional data on a gaging line generated in the gaging process based on the collected data is generated, and three-dimensional path data for a shoemaking robot that buffs and bonds is generated based on the two-dimensional data and then provided to the shoemaking robot. Also, even if the shoemaking robot does not recognize the gaging line separately, it can provide data about the gaging line.

Conventionally, it is difficult to implement a smart factory through process automation because a person has to draw a gaging line using a tool for drawing. However, according to an embodiment of the present invention, the gaging process is automatically performed and the data related to the 3D path in which the shoemaking robot performs the process of buffing and bonding after the gaging process is generated and provided in real-time, which can generate economic benefits and improve the defect rate by reducing errors in processes.

An embodiment of the present invention is not implemented only through the above-described apparatus and/or method, but may be implemented through a program for realizing a function corresponding to the configuration of the embodiment of the present invention, a recording medium on which the program is recorded, and the like. Such implementations may be readily implemented by those skilled in the art from the description of the above-described embodiments.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for drawing a gaging line at a boundary between an upper and a sole of a shoe, comprising:
    obtaining, by a gaging apparatus, operation data according to performing a gaging process of drawing a gaging line at the boundary between the upper and the sole;
    generating, by the gaging apparatus, trajectory data for the boundary between the upper and the sole based on the operation data;
    performing, by the gaging apparatus, three-dimensional (3D) shaping of the trajectory data to obtain 3D shape values according to the gaging process;
    generating, by the gaging apparatus, robot trajectory data for performing a buffing and bonding process after the gaging process according to the 3D shape values; and
    transmitting, by the gaging apparatus, the robot trajectory data to a shoemaking robot performing the buffing and bonding process;
    wherein the operation data comprise an angle adjusting value corresponding to a depth of a groove of the boundary between the upper and the sole.

2. The method of claim 1, further comprising:
    obtaining a rotation value at which a fixed plate on which a last covered with the upper is placed is rotated during the gaging process, and
    the performing 3D shaping comprises performing the 3D shaping using the trajectory data, the rotation value, and the operation data.

3. The method of claim 2, wherein
    the operation data further comprise first driving data that is a positioning value for height of the sole, second driving data that is a positioning value for a size of the shoe, and a force adjusting value representing a trajectory to the boundary between the upper and the sole.

4. The method of claim 3, wherein
    the generating trajectory data comprises generating trajectory data for the boundary between the upper and the sole based on the force adjusting value.

5. The method of claim 3, wherein
    the performing 3D shaping comprises:
    obtaining a thickness of the sole corresponding to the height of the sole based on the first driving data;
    obtaining the size of the shoe based on the second driving data;
    obtaining a shape of the sole based on the angle adjusting value;
    obtaining two-dimensional trajectory data by applying the rotation value to the trajectory data for the boundary between the upper and the sole; and
    obtaining 3D shape values based on the two-dimensional trajectory data, the thickness of the sole, the size of the shoe, and the shape of the sole.

6. The method of claim 3, wherein
    the first driving data corresponds to a driving amount of a line drawing unit of the gaging apparatus moving in a vertical direction so that the line drawing unit is positioned at the boundary between the upper and the sole in the gaging process, and the second driving data corresponds to a driving amount of the line drawing unit moving in a horizontal direction along the boundary between the upper and the sole.

7. The method of claim 6, wherein
    the angle adjusting value comprises third driving data corresponding to a driving amount of an end of the line drawing unit moving up and down so that the line drawing unit is positioned at the groove of the boundary between the upper and the sole in the gaging process, and first sensing data corresponding to a force transmitted from the line drawing unit as the line drawing unit is located at the groove of the boundary between the upper and the sole, and
    the force adjusting value comprises fourth driving data corresponding to a driving amount of the line drawing unit moving back and forth so that the line drawing unit presses the groove of the boundary between the upper and the sole to draw a gaging line, and second sensing data corresponding to a force transmitted from the line drawing unit as the line drawing unit moves back and forth.

8. The method of claim 7, further comprising:
    after the obtaining operation data,
    performing the gaging process for drawing the gaging line at the boundary between the upper and the sole, and
    when the gaging process is performed, an arm unit connected to the line drawing unit of the gaging apparatus moves in a vertical direction and a horizontal direction so that the line drawing unit draws the gaging line along the boundary between the upper and the sole, and an angle adjusting unit connected to the line drawing unit moves the line drawing unit up and down so that the end of the line drawing unit is positioned at the groove of the boundary, and a force adjusting unit connected to the line drawing unit moves the line drawing unit back and forth so that the end of the line drawing unit presses the groove to draw the gaging line.

9. The method of claim 8, wherein
    the first driving data corresponds to a driving amount according to movement of the arm unit in the vertical direction, the second driving data corresponds to a driving amount according to movement of the arm unit in the horizontal direction, the third driving data corresponds to a driving amount in which the angle adjusting unit moves the line drawing unit up and down, the first sensing data corresponds to a force acting from the line drawing unit to the angle adjusting unit, the fourth driving data corresponds to a driving amount in which the force adjusting unit moves the line drawing unit back and forth, and the second sensing data corresponds to a force acting from the line drawing unit to the force adjusting unit.

10. A gaging apparatus for drawing a gaging line at a boundary between an upper and a sole of a shoe, comprising:
an operation data receiver configured to obtain operation data according to performing a gaging process of drawing a gaging line at the boundary between the upper and the sole; and
a data processor configured to generate trajectory data for the boundary between the upper and the sole based on the operation data, perform three-dimensional (3D) shaping of the trajectory data to obtain 3D shape values according to the gaging process, generate robot trajectory data for performing a buffing and bonding process after the gaging process according to the 3D shape values, and transmit the robot trajectory data to a shoemaking robot performing the buffing and bonding process;
wherein the operation data comprise an angle adjusting value corresponding to a depth of a groove of the boundary between the upper and the sole.

11. The gaging apparatus of claim 10, further comprising:
a last fixing unit configured to obtain a rotation value at which a fixed plate on which a last covered with the upper is placed is rotated during the gaging process, wherein
the data processor is configured to perform the 3D shaping using the trajectory data, the rotation value, and the operation data.

12. The gaging apparatus of claim 11, wherein
the operation data further comprise first driving data that is a positioning value for height of the sole, second driving data that is a positioning value for a size of the shoe, and a force adjusting value representing a trajectory to the boundary between the upper and the sole.

13. The gaging apparatus of claim 12, wherein
the data processor comprises:
a trajectory calculation unit configured to generate trajectory data for the boundary between the upper and the sole based on the force adjusting value;
a 3D shaping unit configured to obtain a thickness of the sole corresponding to the height of the sole based on the first driving data, obtain the size of the shoe based on the second driving data, obtain a shape of the sole based on the angle adjusting value, obtain two-dimensional trajectory data by applying the rotation value to the trajectory data for the boundary between the upper and the sole, and obtain 3D shape values based on the two-dimensional trajectory data, the thickness of the sole, the size of the shoe, and the shape of the sole;
a robot trajectory generation unit configured to generate the robot trajectory data for performing the buffing and bonding process after the gaging process according to the 3D shape values; and
a data transferring unit configured to transfer the robot trajectory data to the shoemaking robot.

14. The gaging apparatus of claim 10, further comprising
a gaging driving unit for automatically performing the gaging process,
wherein the gaging driving unit comprises:
a line drawing unit;
an arm unit connected to the line drawing unit and configured to move in a vertical direction and a horizontal direction so that the line drawing unit draws a gaging line along the boundary between the upper and the sole;
an angle adjusting unit connected to the line drawing unit and configured to move the line drawing unit up and down so that the line drawing unit is positioned at the groove of the boundary; and
a force adjusting unit connected to the line drawing unit and configured to move the line drawing unit back and forth so that the line drawing unit presses the groove to draw the gaging line.

15. The gaging apparatus of claim 14, further comprising
a measurement unit configured to measure data according to driving of the gaging driving unit,
wherein the measurement unit comprises:
a first driving measurement unit configured to measure first driving data which is a driving amount according to movement of the arm unit in a vertical direction and second driving data which is a driving amount according to movement of the arm unit in a horizontal direction;
a second driving measurement unit configured to measure third driving data corresponding to a driving amount in which the angle adjusting unit moves the line drawing unit up and down and first sensing data corresponding to a force acting from the line drawing unit to the angle adjusting unit; and
a third driving measurement unit configured to measure fourth driving data corresponding to a driving amount in which the force adjusting unit moves the line drawing unit back and forth and second sensing data corresponding to a force acting from the line drawing unit to the force adjusting unit.

16. The gaging apparatus of claim 15, wherein
the data processor is configured to generate trajectory data for the boundary between the upper and the sole based on the fourth driving data and the second sensing data, obtain a thickness of the sole corresponding to a height of the sole based on the first driving data, obtain a size of the shoe based on the second driving data, and obtain a shape of the sole based on the third driving data and the first sensing data to obtain the 3D shape values.

17. The gaging apparatus of claim 15, wherein
the second driving measurement unit comprises
a pressure sensor measuring the first sensing data, and
a value of a parameter used in operation of the pressure sensor is set differently according to types of shoes used in the gaging process.

18. The gaging apparatus of claim 14, wherein
the line drawing unit comprises:
an inner shim connected to the angle adjusting unit and the force adjusting unit;
an end connected to the inner shim to draw the gaging line; and
an outer body covering the inner shim and the end.

19. A method for drawing a gaging line at a boundary between an upper and a sole of a shoe, comprising:
obtaining, by a gaging apparatus, operation data according to performing a gaging process of drawing a gaging line at the boundary between the upper and the sole;
generating, by the gaging apparatus, trajectory data for the boundary between the upper and the sole based on the operation data;
performing, by the gaging apparatus, three-dimensional (3D) shaping of the trajectory data to obtain 3D shape values according to the gaging process;
generating, by the gaging apparatus, robot trajectory data for performing a buffing and bonding process after the gaging process according to the 3D shape values; and transmitting, by the gaging apparatus, the robot trajectory data to a shoemaking robot performing the buffing and bonding process;

wherein the operation data comprise a force adjusting value representing a trajectory to the boundary between the upper and the sole.

20. The method of claim 19, wherein the generating trajectory data comprises generating trajectory data for the boundary between the upper and the sole based on the force adjusting value.

* * * * *